June 30, 1953 K. F. GALLIMORE 2,643,441
MACHINE TOOL

Filed Sept. 16, 1947 10 Sheets-Sheet 8

INVENTOR
Keith F. Gallimore
By Carlson, Pitzner, Hubbard & Wolfe
ATTORNEYS

Patented June 30, 1953

2,643,441

UNITED STATES PATENT OFFICE 2,643,441

MACHINE TOOL

Keith F. Gallimore, Fond du Lac, Wis., assignor to Giddings & Lewis Machine Tool Company, Fond du Lac, Wis., a corporation of Wisconsin Application September 16, 1947, Serial No. 774,308

1 Claim. (Cl. 29—26)

The invention relates to machine tools and particularly to the class of machine tools commonly known as horizontal boring, drilling and milling machines.

One object of the invention is to provide a machine of the above general character which is very flexible as regards the feeds and speeds for the various machine elements and which embodies improved measuring and controlling means whereby the positioning of the elements and their movements may be controlled efficiently and with a high degree of precision.

Another object is to provide an improved spindle drive mechanism which permits speed changes while the machine is in operation, thereby reducing idle machine time.

Another object is to provide improved spindle feed mechanism which affords a maximum range of spindle travel with a driving ram of minimum length.

Another object is to provide an improved lubricating system for machine tool headstocks.

Still another object is to provide improved measuring means which greatly facilitates the accurate positioning of the machine elements.

A further object is to provide an improved electrical control system particularly suitable for large machine tools which allows accurate control of the movements of a machine element in incremental steps.

Other objects and advantages of the invention will become apparent from the following detailed description of the preferred embodiment illustrated in the accompanying drawings, in which:

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claim.

Referring to the drawings, the machine selected to illustrate the invention comprises generally an elongated horizontal bed 20 having an end support or tailstock column 21 at one end and a headstock column 22 at the other end. The latter column supports a vertically adjustable headstock 23 equipped with a horizontally disposed axially slidable tool spindle 24.

The tailstock column 21 supports a vertically adjustable end block or tailstock 26 which cooperates in well-known manner with the spindle 24 in supporting a boring bar (not shown) or similar elongated tool member. The column 21 is adjustable longitudinally of the machine bed for the accommodation of boring bars of different lengths.

Figure 1:
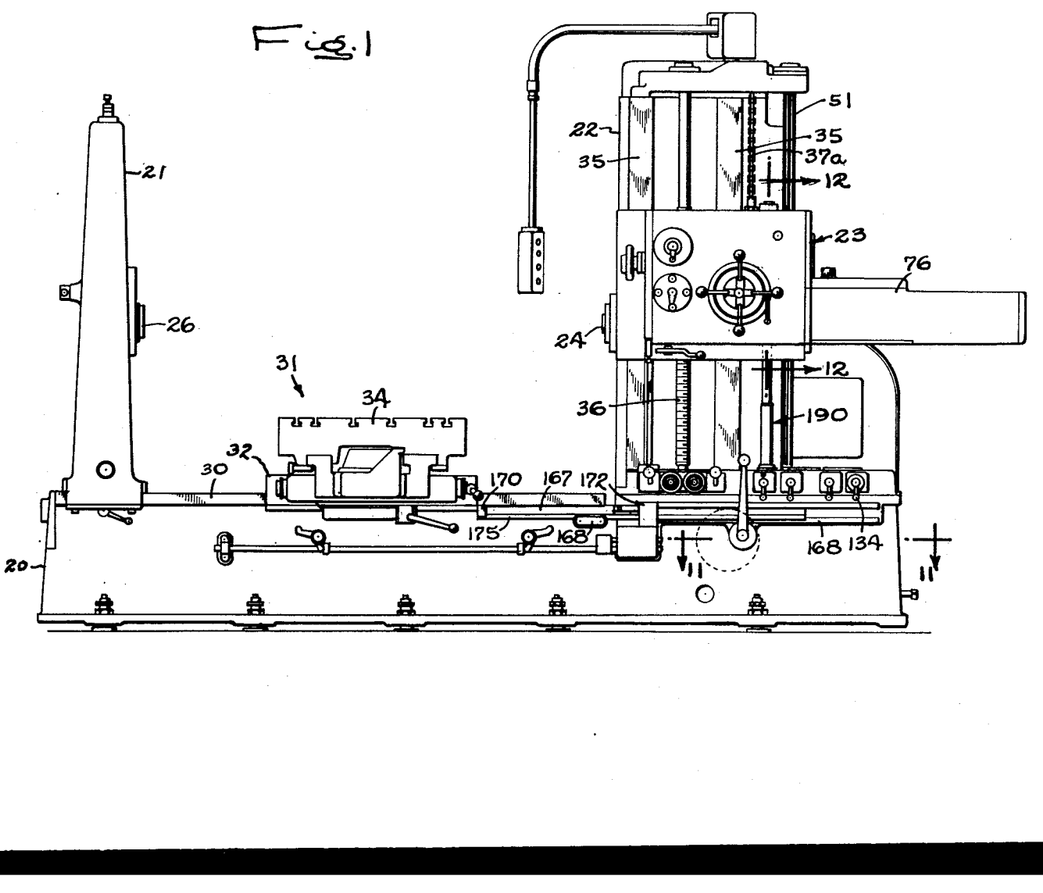
Figure 1 is a front elevational view of a machine tool embodying the features of the invention.
Figure 2:
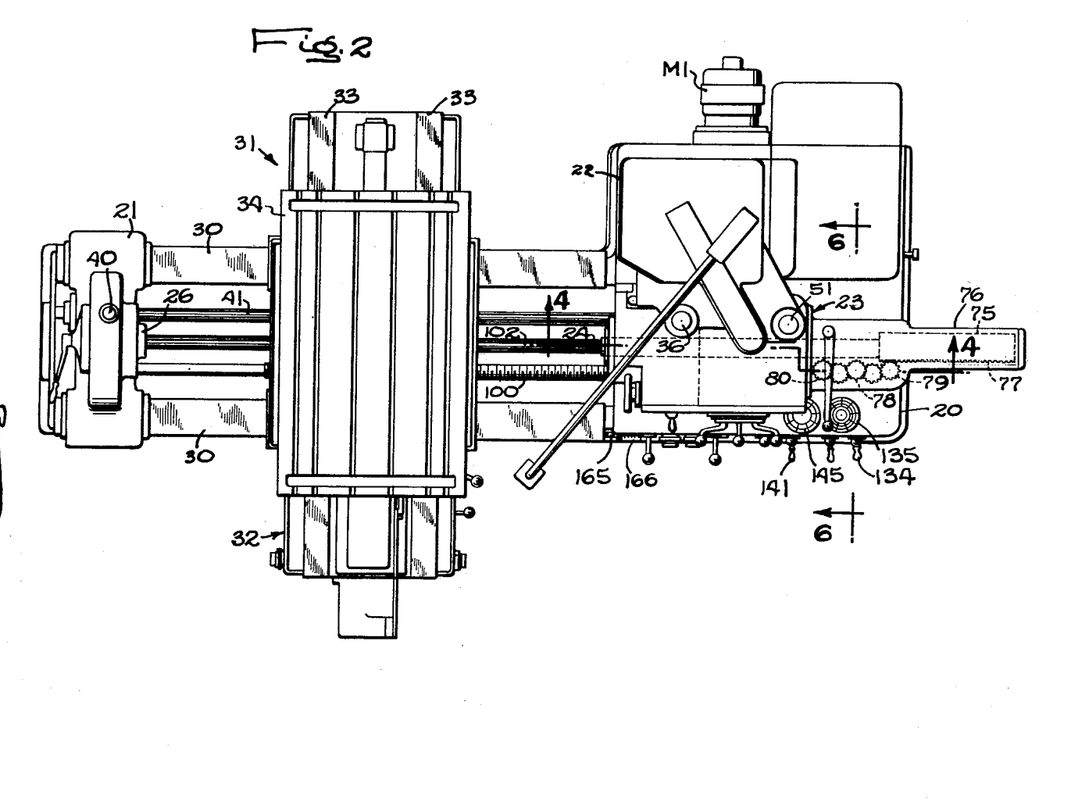
Fig. 2 is a plan view of the machine shown in Fig. 1.
Figure 3:
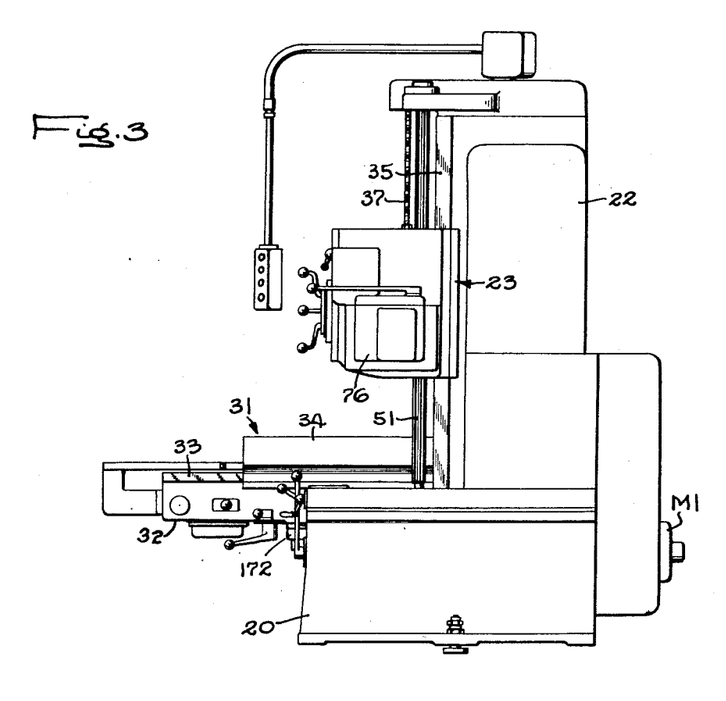
Fig. 3 is an end elevational view of the machine.

As shown in Fig. 2, the bed 20 is provided on its upper face with spaced parallel ways 30 for adjustably supporting a carriage 31 adapted to present work to the tool carried by the spindle 24. Preferably the carriage comprises a saddle 32 slidable longitudinally of the machine bed on the ways 30. The top of the saddle is formed with spaced parallel ways 33 on which a work supporting table 34 is mounted for movement transversely of the machine bed.

The column 22, as herein shown, is in the form of an upright hollow casting bolted or otherwise rigidly secured to the top of the machine bed 20 adjacent one end of the bed. The column is provided at its front face with spaced parallel vertical ways 35 for supporting and guiding the headstock 23 in its vertical adjustments. Such adjustments are effected through the medium of a feed screw 36 rotatably anchored at its upper end on the column and coacting with a fixed nut 37 (Fig. 9) carried by the headstock. At its lower end the feed screw is connected with driving mechanism including a multiple speed transmission T housed in the column end of the machine bed, as will appear presently. To relieve the strain on the feed screw the headstock is counterbalanced by a weight (not shown) enclosed in the hollow column and operatively connected with the headstock in the usual manner by a flexible member or chain 37a.

The tailstock 26 is adjusted vertically coincident with the adjustment of the headstock by means of a vertically disposed feed screw 40 rotatably supported on the tailstock column 21. To coordinate the movements of the headstock and tailstock, the feed screws 36 and 40 are operatively connected by a shaft 41 extending longitudinally of the machine bed. A bevel gear 42 fast on one end of the shaft 41 is in driving relation with a driving gear 43 keyed to the lower end of the feed screw 36. The shaft 41 is splined to provide a slidable driving connection with a bevel gear 44 journaled in the base of the tailstock column 21. Gear 44 drives a bevel gear 45 keyed to the lower end of the feed screw 40. The feed screws are thus rotated in unison to maintain the headstock and tailstock accurately alined in all positions of adjustment.

The headstock 23 may be of any suitable character, as, for example, of the general type disclosed in the Gallimore et al. Patent No. 2,400,819, issued May 21, 1946. Briefly, it comprises a hollow casing 50 which houses the spindle 24 and the gearing for driving and feeding the same. Power for the drive and feed is taken through a multiple speed transmission T' by way of a vertically disposed splined shaft 51 extending along the ways 35 parallel to the feed screw 36. The shaft is journaled at its upper end on the column 22 and is suitably connected with the transmission T' which is enclosed in the machine base 20, as will appear presently.

Figures 4, 5:
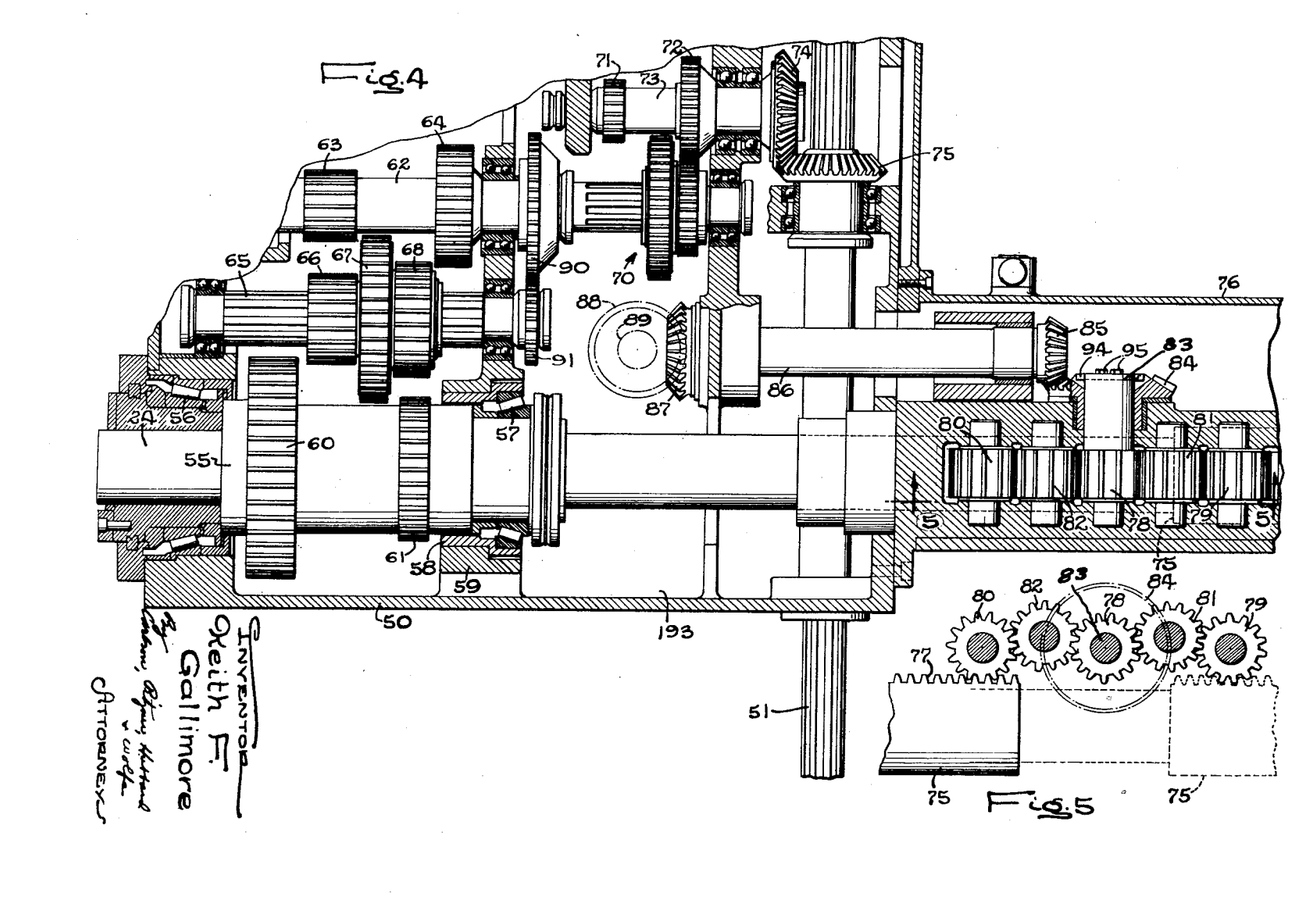
Fig. 4 is a fragmentary vertical sectional view of the headstock taken in a plane substantially on the line 4—4 of Fig. 2.
Fig. 5 is a fragmentary sectional view taken in a plane substantially on the line 5—5 of Fig. 4, showing details of the spindle feed gearing.
Figure 6:
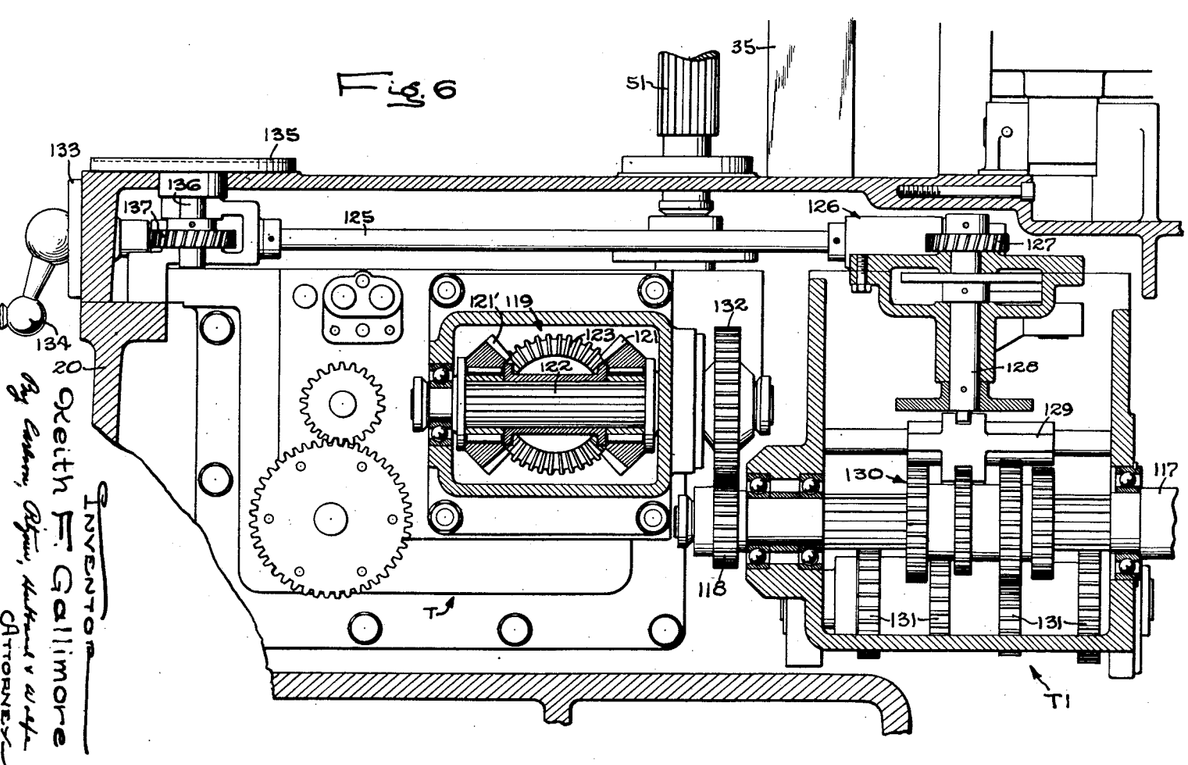
Fig. 6 is a fragmentary vertical sectional view through the machine base, taken in a plane substantially on the line 6—6 of Fig. 2.
Figure 9:
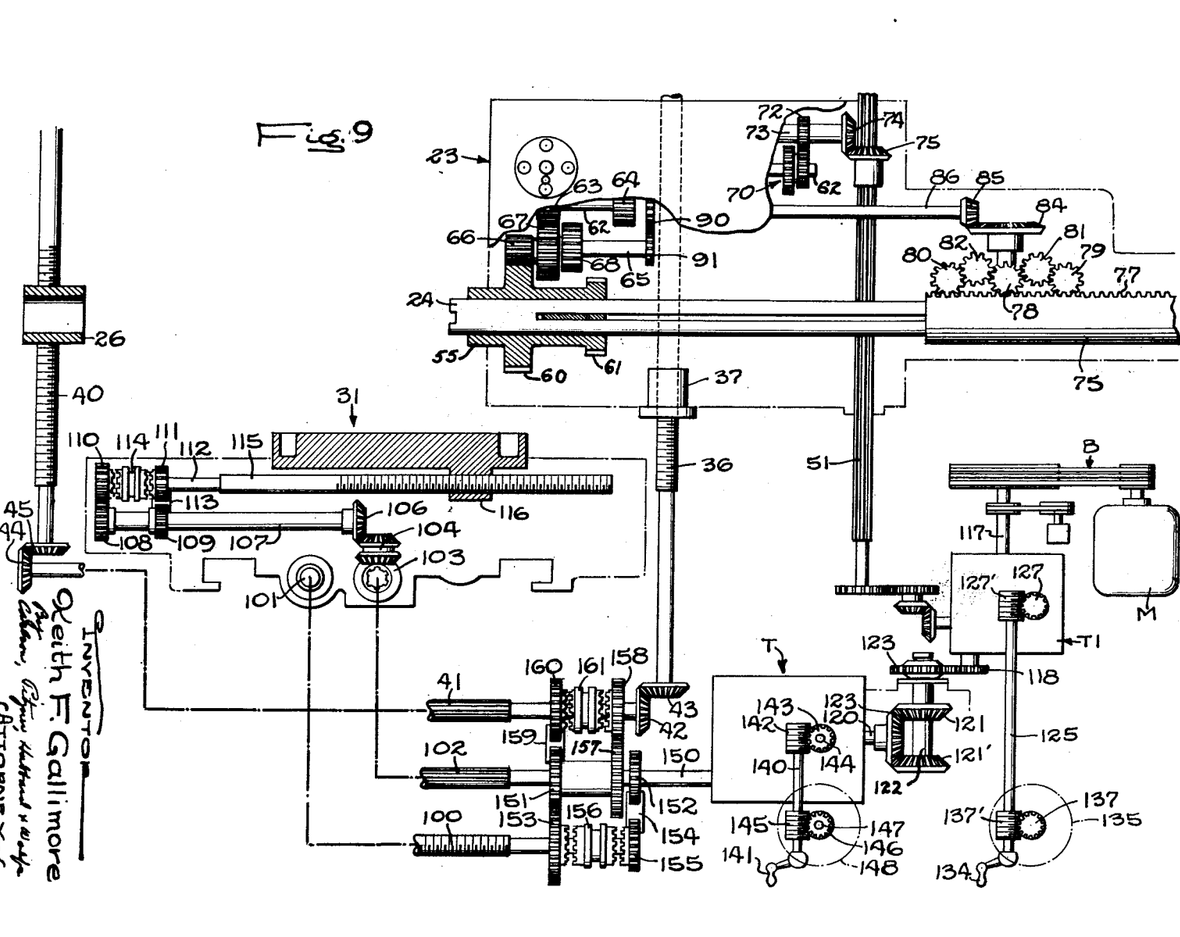
Fig. 9 is a diagrammatic layout of the drive and feed mechanism of the machine and the controls therefor.

Referring to Figs. 4 and 9 of the drawings, the spindle 24 as herein shown extends through and is splined longitudinally in a sleeve member 55 rotatably supported in the casing 50 by antifriction front and rear bearings 56 and 57. In the present instance the rear bearing 57 is mounted in a supporting ring having a reduced end portion 58 closely fitted in a recess formed in a cross member 59 constituting a part of the casing 50. The recess is formed with a counterbore to receive the larger end portion of the annular member 58 with a small amount of clearance so that the latter may expand radially with the bearing as the latter becomes heated in operation. Accurate alinement of the spindle is thus maintained without imposing undue stresses on the bearing.

The spindle driving mechanism incorporated in the headstock embodies novel features of construction which improve the operating efficiency of the machine by permitting the gears to be shifted without stopping the machine thereby reducing idle machine time. For this purpose, the spindle driving sleeve 55 is provided with fixed, axially spaced gears 60 and 61. Journaled in the headstock housing 50 at one side of the spindle is a drive shaft 62 having gears 63 and 64 spaced apart axially thereof similar to the spacing of the gears 60 and 61. Located intermediate the shaft 62 and the spindle 24 and suitably journaled in the casing 50 is a shaft 65 upon which is slidably mounted for axial movement a cluster gear comprising gears 66, 67 and 68. When the gear cluster is shifted to its forward position, a driving connection for the spindle is completed by way of the gears 63, 67, 66 and 60. In the alternate position of the gear cluster, the driving connection with the spindle is established by way of gears 64, 68, 67 and 61. By utilizing gears of the proper diameters, two different speed ranges are thus obtained. The elimination of shiftable gear and clutch elements on the spindle driving sleeve provides a simpler, more compact construction. In accordance with the invention, the various gears are dimensioned and located so that the slidable gears engage the gears on the driving shaft before engaging those on the spindle sleeve. Accordingly, the gears may be effected without stopping the drive shaft. Lost machine time is thus reduced and the general operating efficiency of the machine is correspondingly increased.

In the present instance the shaft 62 is driven from the vertically splined shaft 51 through the medium of a two speed transmission including slidable cluster gear 70 splined at one end of the shaft 62 and cooperating alternately with a pair of gears 71, 72 carried by a countershaft 73. The latter is driven by means of a bevel gear 74 meshing with a bevel gear 75 journaled in the headstock casing 50 and having a splined driving connection with the shaft 51.

Improved feed mechanism is also provided for imparting axial feeding movements to the spindle 24 in either direction. For this purpose the spindle is suitably secured at its inner end to a ram 75 supported in axial alinement therewith by guides formed within a housing 76 bolted or otherwise rigidly secured to the rear face of the headstock casing 50. The ram 75 is formed with rack teeth 77 engageable by a plurality of driving pinions journaled in the housing 76. In accordance with the invention, five such pinions are provided in the present instance, including a main driving pinion 78 and auxiliary driving pinions 79 and 80 spaced apart axially of the spindle and each positioned for coaction with the rack 77. Intermediate pinions 81 and 82 provide driving connections between the pinion 78 and the auxiliary pinions 79 and 80. As the spindle approaches one limit position, for example its forward limit position, the drive is maintained by the pinion 80 alone in engagement with the rack 77, as shown in full lines in Fig. 5. As the spindle approaches its alternate limit position, shown in broken lines in Fig. 5, the drive is assumed exclusively by the pinion 79. In intermediate positions, all three pinions drivingly engage the rack.

In the exemplary machine as shown in Fig. 4, the pinion 78 is mounted on a short shaft 83 having a bevel gear 84 meshing with a bevel gear 85 fast on a shaft 86 disposed parallel to the spindle. The latter is driven through bevel gears 87 and 88 from a shaft 89 constituting the driving shaft of a conventional transmission mounted on the headstock. This transmission is driven from a gear 90 rotatably supported on the shaft 62 and meshing with a pinion 91 keyed to the shaft 65. It will be observed that the latter shaft is splined for driving engagement with the gears 66—68 so that the feed mechanism is driven whenever the spindle driving gears are engaged.

To guard against damage to the spindle, provision is made for interrupting the drive for the pinion shaft 83 in the event that excessive resistance is opposed to the movement of the spindle. For this purpose the gear 84 is drivingly connected with the shaft 83 by means of a shear key 94 disposed in diametrical slots in the end of the shaft and the adjacent face of the gear. The key is held in place by machine screws 95 and is readily accessible from the side of the housing 76 for replacement.

In the exemplary machine, the feed for the saddle 32 is also taken from the transmission T by way of a feed screw 100 extending longitudinally of the machine bed. The feed screw coacts with a stationary nut 101 carried by the saddle.

Figure 7:
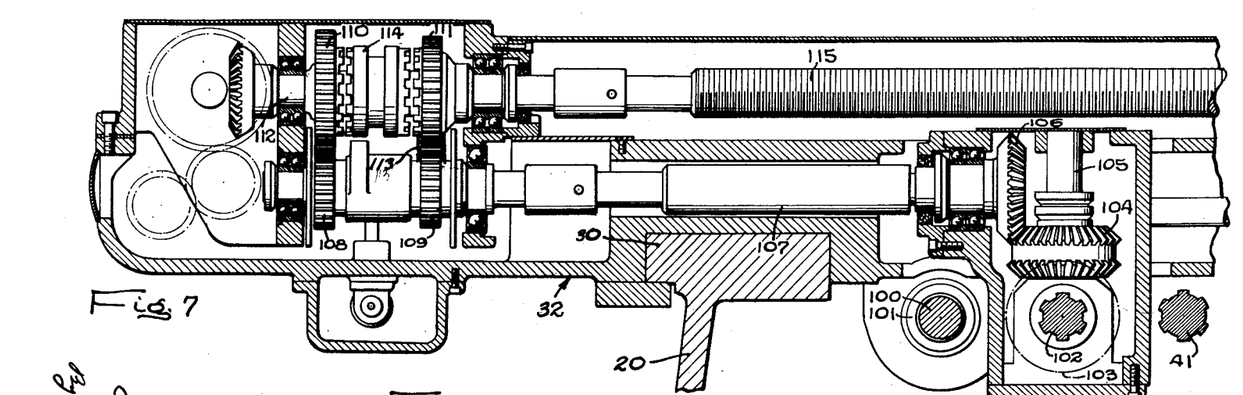
Fig. 7 is a fragmentary sectional view through the saddle and table, showing details of the table feed mechanism.

The transmission T additionally serves to drive the table feed mechanism. The drive, in this instance, includes a splined shaft 102 extending longitudinally of the machine bed and cooperating with a bevel gear 103 rotatably mounted on the saddle 32. The gear 103 meshes with one gear element of a double bevel gear 104 rotatably supported on a vertical shaft 105 mounted on the saddle. The upper element of the double bevel gear 104 coacts with a bevel gear 106 keyed to a drive shaft 107 extending longitudinally of the saddle and terminating adjacent the forward end thereof. Gears 108 and 109 (Figs. 7 and 9) keyed to the shaft 107 respectively drive gears 110 and 111 rotatably mounted on a parallel shaft 112, the drive for the gear 111 including an intermediate gear 113 thus effecting reverse rotation of the gear 111 with respect to the gear 110. Either of the latter gears may be drivingly engaged with the shaft 112 selectively through the medium of a shiftable clutch, the sleeve 114 having a splined connection with the shaft 112. The latter shaft is axially alined with and drivingly coupled to a feed screw 115 which coacts with a stationary nut 116 (Fig. 9) carried by the table.

In the exemplary machine the column end of the machine bed 20 is constructed in the form of a hollow casting to serve as a housing for the transmissions T and T1 and associated driving and control instrumentalities. The transmissions may be of any suitable character, as, for example, nine-speed transmissions of the general type disclosed in the Gallimore Patent No. 2,106,731, granted February 1, 1938.

As shown in Fig. 9, the transmission T1 is driven by an electric motor M through a V-belt drive B to a shaft 117 constituting the driven shaft of the transmission. The transmission T in turn is driven through a pick-off gear 118 from the transmission T1 and a one-way drive mechanism 119 associated with the driving shaft 120 of the transmission T. The one-way drive mechanism 119 is of well known construction comprising a pair of bevel gears 121, 121' mounted on a shaft 122 and each provided with a one-way clutch connection therewith. The gears 121 and 121' both mesh with a bevel gear 123 on the shaft 120, the arrangement being such that the shaft 120 is rotated in one direction irrespective of the direction of rotation of the motor M. The motor M may therefore be reversed to reverse the direction of spindle rotation or spindle feed without affecting the feeds for the headstock, tailstock, saddle or table.

The transmissions T and T1 are preferably of the type in which the speed adjustments are effected by rotation of an adjusting or control element. The adjusting means for the transmission T1 includes a shaft 125 extending from the front of the machine bed rearwardly to a gear casing 126 enclosing the transmission gearing. A worm 127' on the shaft engages a worm wheel 127 on a shaft 128 which through suitable actuating mechanism is effective to actuate a clutch shifter shoe 129, which in turn positions a cluster gear 130 in selective driving engagement with one of a series of intermediate gears 131. The cluster gear 130 has a splined driving connection with the driven shaft 117 of the transmission. It will be observed that the pick-off gear 118 for driving the transmission T coacts with a pinion 132 keyed to the shaft 122. At its forward end, the shaft 125 is provided with conventional clutch means 133 for attachment of a control or adjusting element such as a hand crank 134 by which the shaft may be rotated manually.

To facilitate adjustment of the transmission T1 a suitable indicator disk 135 is provided on the machine bed to indicate the set condition of the transmission. The disk 135, in this instance, is mounted on a vertical shaft 136 journaled on the machine bed and driven by a worm wheel 137 cooperating with a worm 137' on the shaft 125. As the speed range of the spindle may be varied by adjustment of the gearing in the headstock, it will be appreciated that the actual spindle speed resulting from adjustment of the transmission T1 will vary correspondingly. Accordingly, the indicator disk 135 may be provided with a series of concentric scales, as shown in Fig. 2, each scale representing one of the speed ranges provided by the headstock gearing. As a matter of convenience, these scales may be identified by different colors keyed to corresponding colors associated with the speed change lever on the headstock.

The transmission T may be similar to the transmission T1 and arranged for adjustment by a rotary shaft 140 (Fig. 9) having a hand crank 141 at its outer end and a worm 142 on its inner end driving a worm gear 143 fast on an adjusting shaft 144 for the transmission. The shaft 140 also has a worm 145 driving a worm gear 146 mounted on a shaft 147 which carries an indicating disk 148 similar in general to the disk 135.

As shown in Fig. 9, the driving shaft 150 of the transmission T is alined with and coupled to the splined shaft 102 for the table drive. The shaft 150 carries a pair of gears 151 and 152, the first-mentioned gear meshing directly with a gear 153 rotatably mounted on an extension of the saddle feed screw 100 and the gear 152 meshing with an idler gear 154 which, in turn, meshes with a gear 155 rotatably mounted on the feed screw extension. The gears 153 and 155 are accordingly rotated in opposite directions and may be coupled with the feed screw 100 selectively through the medium of a sliding clutch member 156 keyed to the feed screw.

The shaft 150 carries a third gear 157 which meshes with a gear 158 rotatably mounted on an extension of the splined shaft 41 which drives the headstock and tailstock feed screws 36 and 40. The gear 151 previously referred to is connected through an intermediate gear 159 with a gear 160 rotatably mounted on the shaft extension in spaced relation to the gear 158. The gears 158 and 160 are accordingly rotated reversely and are adapted to be coupled selectively with the shaft 41 by means of a sliding clutch member 161 keyed to the shaft 41. Thus, by manipulation of the clutch member 161 the headstock and tailstock feed screws may be rotated in either direction and at a speed determined by the setting of the transmission T.

Figure 8:
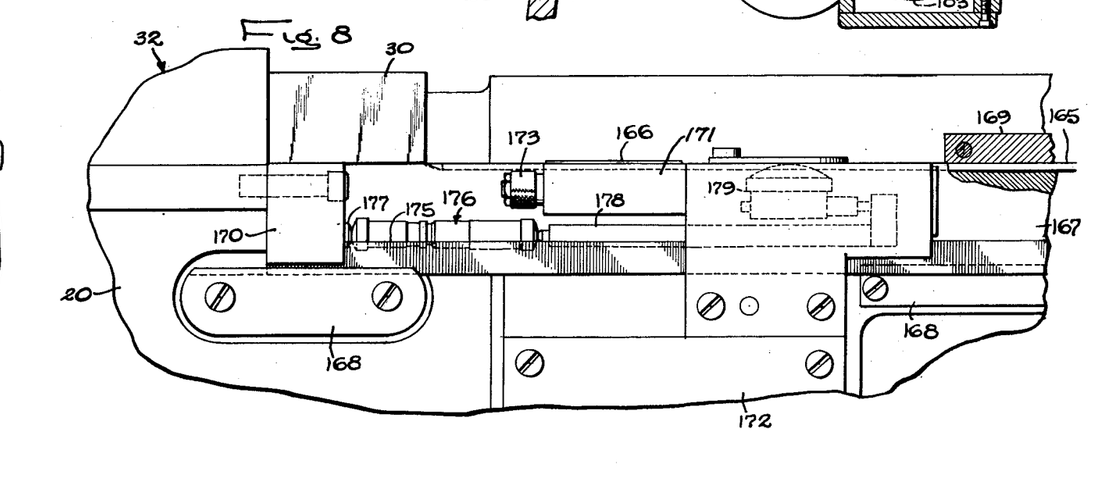
Fig. 8 is an enlarged front view of the measuring means for locating the saddle.

Novel means is provided whereby the attendant, while standing close to the headstock column and in position to manipulate the various manual controls, may readily determine the position of the saddle 32 and measure its movement from one position to another. To this end an accurately graduated scale 165 (Figs. 8, 9a and 9b) is secured to the saddle 32 for movement therewith. This scale cooperates with a vernier scale 166 stationarily supported on the machine bed adjacent the headstock column, as shown in Fig. 2. The latter scale is conveniently located for visual inspection by the attendant while operating the saddle feed controls to shift the saddle along the ways 30.

Figure 9A:
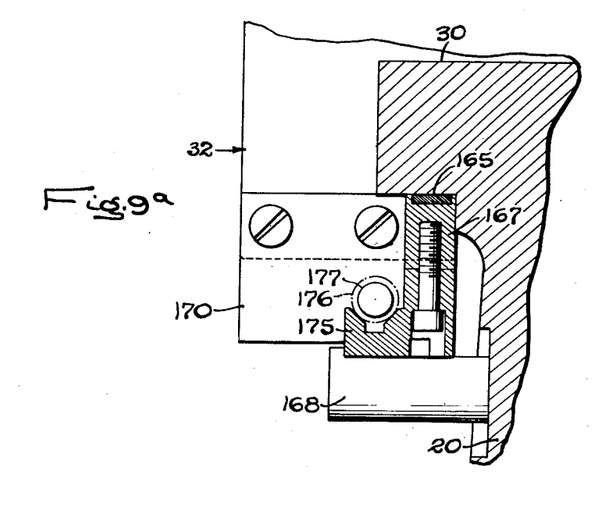
Fig. 9a is a transverse sectional view of the measuring means shown in Fig. 8.
Figure 9B:
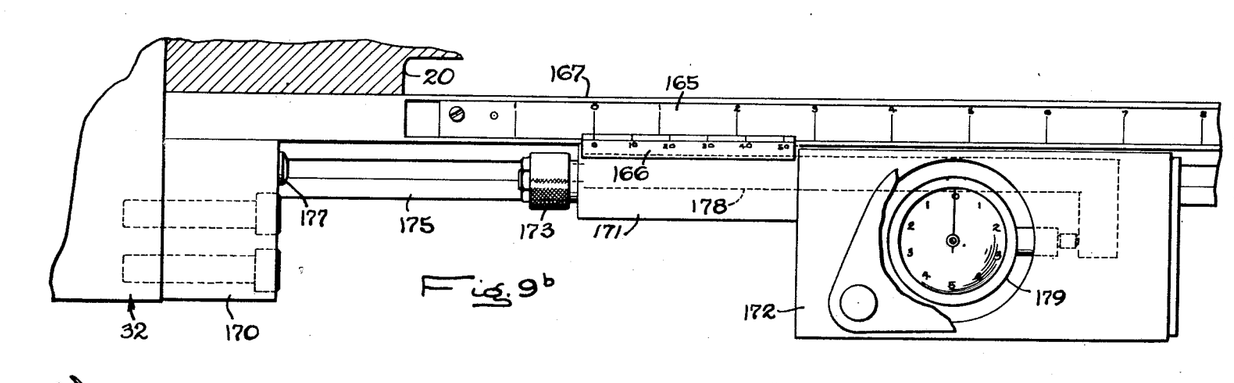
Fig. 9b is a plan view of the measuring means.

Referring now to Figs. 9a and 9b, the scale 165 as herein shown is in the form of an elongated flat bar seated in an upwardly opening longitudinal recess in a slide 167 supported and guided for movement longitudinally of the machine bed by suitable guides 168 and 169. At one end the slide 167 is rigidly secured to the saddle by means of a bracket 170.

The vernier scale 166 which coacts with the main scale 165 is suitably supported on an extension 171 of a bracket 172 bolted or otherwise rigidly secured to the side of the machine bed. The vernier scale may be of any preferred type and, as herein shown, is arranged for adjustment by means of a nut 173.

The slide 167 may also be provided with a forwardly extending flange 175 which has a longitudinal recess forming a trough for the reception of a conventional micrometer measuring bar 176. A locating button 177 is provided on the bracket 170 for accurately locating one end of the micrometer bar which is adapted to coact at its other end with a plunger 178 associated with a conventional dial type micrometer indicator 179 supported on the bracket 172. Thus the spacing of the saddle from a fixed point on the machine bed may be accurately measured when the machine is initially set up and the vernier scale 166 may be adjusted with respect to the scale 165 so that thereafter, the position of the saddle may be determined accurately from the scale 165.

The invention also provides an improved lubricating system for use with the headstock of a machine tool. In the improved system, provision is made for accommodating the main oil supply in a reservoir located within the machine bed and a continuous circulation of lubricant between the reservoir and a sub-reservoir in the headstock is maintained through an extensible conduit system connecting the headstock with the reservoir. A much greater volume of lubricant such as machine oil, may thus be used, thereby avoiding overheating of the oil, and moreover more rapid cooling may be effected in the heavy structure forming the machine bed.

Figure 11:
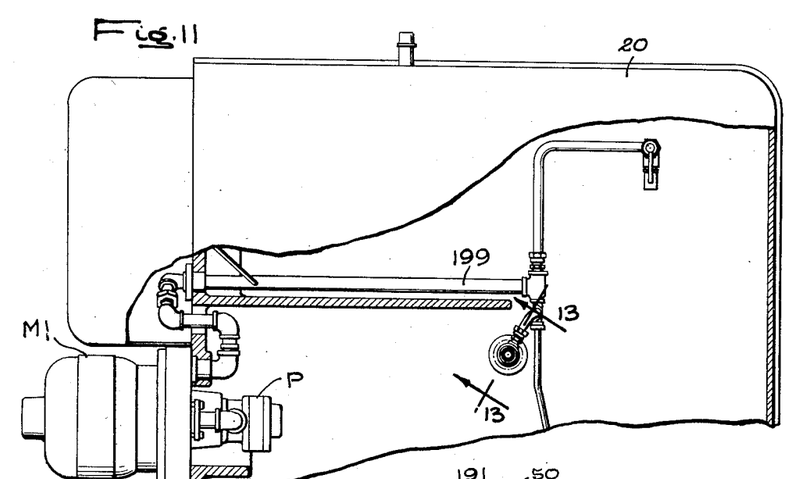
Fig. 11 is a horizontal sectional view through the machine bed, taken in a horizontal plane substantially on the line 11—11 of Fig. 1, showing details of the headstock lubricating system.
Figure 12:
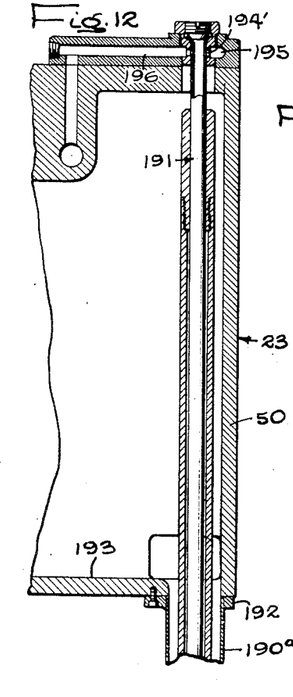
Fig. 12 is a sectional view of the headstock taken in a vertical plane substantially on the line 12—12 of Fig. 1.
Figure 13:
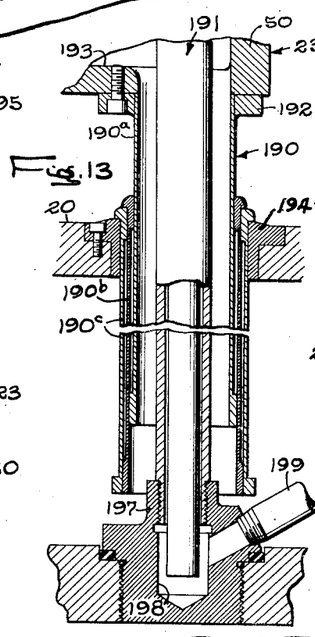
Fig. 13 is a fragmentary sectional view of the lubricating conduit system taken in a plane substantially on the line 13—13 of Fig. 11.

Referring to Figs. 11–13 of the drawings, the extensible conduit system in its preferred form comprises a pair of telescoping conduit elements 190 and 191 arranged one within the other to define a pair of contiguous flow passages. The larger outer conduit 190 is provided at its upper end with a flange 192 adapted to be secured to the bottom wall of the headstock casing 50, as by machine screws. The interior of the conduit 190 opens into the bottom of a sub-reservoir 193 formed within the headstock casing.

In the particular form illustrated in Fig. 13, the outer conduit 190 comprises three sections 190a, 190b and 190c, the latter being slidably received in a bushing 194 secured in the top wall of the machine bed 20. The wall, in this instance, defines the top of the main lubricant reservoir in the bed. The conduit 190 accordingly provides a passage for the free flow of lubricant from the sub-reservoir in the headstock to the main reservoir in the machine bed.

The inner conduit 191 likewise comprises a plurality of sections, the upper one of which extends through the sub-reservoir in the headstock casing 50 and is anchored to the top wall of the casing. Apertures 194' in the upper end of the conduit open into an annular chamber 195 which communicates with the sub-reservoir 193 through a duct 196 formed in the casing.

At its lower end the lowermost section of the conduit 191 is threaded into a fitting 197 which has an internal chamber 198 to which the lubricant or oil is supplied by way of a pipe 199. In the present instance the flow of lubricant is maintained by a suitable pump P driven by an electric motor M1. The pump P withdraws fluid from the reservoir in the machine bed and such fluid is delivered by way of the pipe 199, chamber 198, conduit 191, chamber 195 and duct 196 to the sub-reservoir 193. The fluid in the sub-reservoir is distributed to the gears and other elements enclosed in the headstock housing in the usual manner and is then returned to the main reservoir by way of the outer conduit 190.

Figure 14:
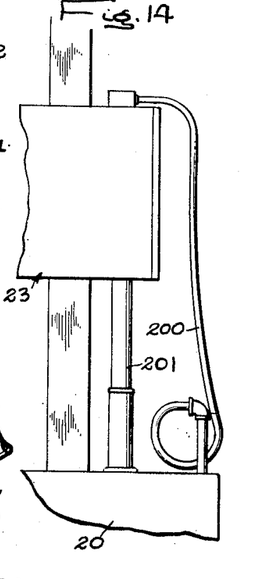
Fig. 14 is a fragmentary elevational view of a modified form of the lubricating system.

Figure 14 discloses a modified form of the lubricating system wherein the oil is supplied from the reservoir in the machine bed to the sub-reservoir in the toolhead through a flexible tube 200. Used oil is returned to the main reservoir through a telescoping tubular conduit 201 similar in construction to the conduit 190 heretofore described.

The electrical control system of the machine is arranged to provide three different types of "inching" operations which greatly facilitate the positioning of the movable machine elements and also the changing of the gears in the spindle drive. The operation of the control circuit concerned with the inching operations is shown diagrammatically in Fig. 10.

Figure 10:
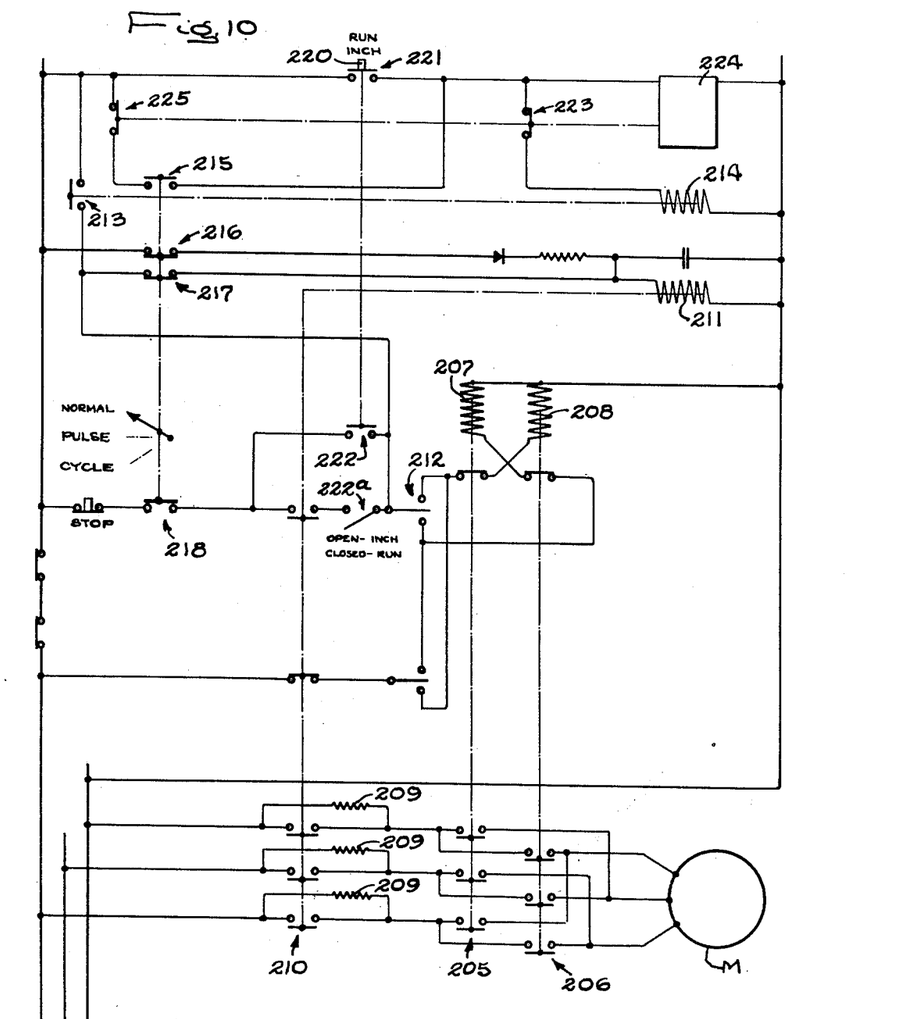
Fig. 10 is a diagrammatic representation of the electrical control circuit of the machine.

Referring to the drawing, it will be observed that the operating circuit for the motor M is controlled by a forward running switch 205 and a reverse running switch 206 actuated respectively by solenoids 207 and 208. Resistors 209 are normally connected in the motor circuit and are arranged to be shunted by the contacts of a switch 210 actuated by a solenoid 211. The solenoids 207 and 208 are adapted to be energized alternately under control of a two-position switch 212 and a switch 213 actuated by a control relay 214.

For controlling the various inching operations there is provided a three-position selector switch having four sets of switch contacts 215, 216, 217 and 218. In the first or Normal position of the switch, contacts 216 and 217 are closed and contacts 215 and 218 are opened. In the second or Pulse position of the switch, all of the switch contacts are opened. In the third or Cycle position of the switch, contacts 216 and 217 are open and contacts 215 and 218 are closed.

The invention contemplates the use of a combined Run-Inch push button switch which may be of a well known commercial type having a push button 220 operable to close a set of normally open switch contacts 221. The switch is provided with a latch ring (not shown) by which a second set of switch contacts 222ª are controlled. The arrangement is such that the latter switch contacts are closed when the latch ring is set in "run" position and opened when the latch ring is set in "inching" position.

With the selector switch set in the Normal position, actuation of the push button 220 completes a circuit for the control relay 214 by way of switch 221 and a timer controlled switch 223 described hereinafter. Relay 214 upon becoming energized closes the switch 213 to complete a circuit for one or the other of the solenoids 207 and 208, thereby initiating operation of the motor M at low speed because of the inclusion of the resistors 209 in the running circuit. Such operation continues as long as the push button is actuated and the motor is stopped upon release of the push button. The motor may be provided with a suitable brake or plugging device for insuring a quick stop.

With the selector switch set in the Pulse position, depression of the push button 220 closes switch contacts 221 to energize the control relay 214 and initiate the operation of a timer 224. This may be of any preferred type operative to periodically open the normally closed switch 223 and a normally closed switch 225. Control relay 214 initiates operation of the motor M as above described. Opening of the switch 223, which occurs a predetermined time after the actuation of the push button 220, interrupts the circuit of the control relay 214 which becomes deenergized and opens switch 213 to stop the motor. Thus, on each actuation of the push button 220 the motor is operated for a short predetermined interval and is then automatically stopped by the action of the timer.

When the selector switch is set in the cycle position, switch contacts 215 are closed to complete a circuit for the timer 224, which circuit is opened periodically by actuation of the timer switch 225. Moreover, the control relay 214 is energized in parallel with the timer by way of switch contacts 223. Thus the timer and control relay operate in regularly recurring cycles under control of the timer and in each such cycle the motor M is energized for a short period. Accordingly, the motor driven elements are inched or jogged periodically as long as the selector switch remains in the cycle position. In this instance, the circuit for the solenoid 211 is open at the switch contacts 217 of the selector switch, thus maintaining the switch contacts 210 open so that resistors 209 are effective to reduce the current supply from the motor and thereby cause it to operate at low speed.

It will be apparent from the foregoing that the invention provides a machine tool of the horizontal boring, drilling and milling machine type embodying novel features of construction which materially increase its efficiency and which greatly facilitate its operation.

I claim as my invention:

In a machine tool having a rotatable and axially reciprocable spindle, means for feeding the spindle axially comprising, in combination, a reciprocable ram axially alined with and connected to the spindle, said ram having a longitudinally extending rack on one side thereof, first, second and third drive pinions spaced along said ram and meshing directly with said rack, said second pinion being intermediately disposed relative to said first and third pinions, said above three pinions having their axes disposed in a common plane extending parallel to the axis of said ram, means for rotatably driving said second pinion, a fourth pinion meshing directly with said first and second pinions for driving the former, and a fifth pinion meshing directly with said second and third pinions for driving the latter, said fourth and fifth pinions being positioned with their axes disposed in a plane parallel to said common plane and offset outwardly therefrom relative to said rack, said fourth and fifth pinions being adjacent said rack but spaced radially outwardly therefrom.

KEITH F. GALLIMORE.

References Cited in the file of this patent

UNITED STATES PATENTS

| Number | Name | Date |
| --- | --- | --- |
| 1,796,332 | Johnson | Mar. 17, 1931 |
| 1,909,564 | Armitage | May 16, 1933 |
| 1,923,493 | Lovely | Aug. 22, 1933 |
| 2,002,480 | Gallimore | May 21, 1935 |
| 2,029,335 | Oberhoffken et al. | Feb. 4, 1936 |
| 2,226,431 | Hassman et al. | Dec. 24, 1940 |
| 2,244,413 | Armitage | June 3, 1941 |
| 2,251,015 | Gallimore | July 29, 1941 |
| 2,269,641 | Woytych | Jan. 13, 1942 |
| 2,283,746 | Lohs | May 19, 1942 |
| 2,319,480 | Saving et al. | May 18, 1943 |
| 2,345,060 | Morton | Mar. 28, 1944 |
| 2,363,934 | Bennett | Nov. 28, 1944 |
| 2,376,303 | Woytych et al. | May 15, 1945 |
| 2,387,820 | Armitage et al. | Oct. 30, 1945 |
| 2,474,104 | Groene et al. | June 21, 1949 |